United States Patent [19]

Kunz

[11] 4,160,445
[45] Jul. 10, 1979

[54] PRESSURE VESSEL AND METHOD FOR COOKING FOOD IN A PRESSURE VESSEL

[76] Inventor: Paul Kunz, Deishardtstr. 3, 5419 Döttesfeld, Fed. Rep. of Germany

[21] Appl. No.: 772,158

[22] Filed: Feb. 25, 1977

[30] Foreign Application Priority Data

Mar. 11, 1976 [DE] Fed. Rep. of Germany ....... 2610221

[51] Int. Cl.² ............................................. F24D 1/02
[52] U.S. Cl. ............................. 126/369.1; 126/369.2; 99/348; 99/467; 99/516; 99/409; 134/120
[58] Field of Search .................... 99/348, 467, 516; 259/175, 176, 177 R; 34/216, 217, 133; 68/5 C, 20; 126/369, 369.1, 369.2

[56] References Cited

U.S. PATENT DOCUMENTS

| | | | |
|---|---|---|---|
| 2,293,435 | 8/1942 | Johnson | 34/109 |
| 3,121,621 | 2/1964 | Jackson | 34/133 |
| 3,134,203 | 5/1964 | Roberts | 34/109 |
| 3,234,571 | 2/1966 | Buss | 68/5 C |
| 3,597,851 | 8/1971 | Arendt et al. | 68/5 C |
| 3,651,580 | 3/1972 | Meyer | 34/133 |

*Primary Examiner*—John J. Camby
*Assistant Examiner*—Larry I. Schwartz
*Attorney, Agent, or Firm*—Pollock, Vande Sande & Priddy

[57] ABSTRACT

Method and pressure vessel for cooking food. The pressure vessel is divided into two zones one of which receives the food to be cooked and the other of which may receive a predetermined quantity of liquid. The pressure vessel is periodically pivoted during cooking with saturated steam, and due to the pivotal or rotational movement the liquid passes periodically from one zone into the other, thus wetting the food retained therein, and back into the former zone.

11 Claims, 8 Drawing Figures

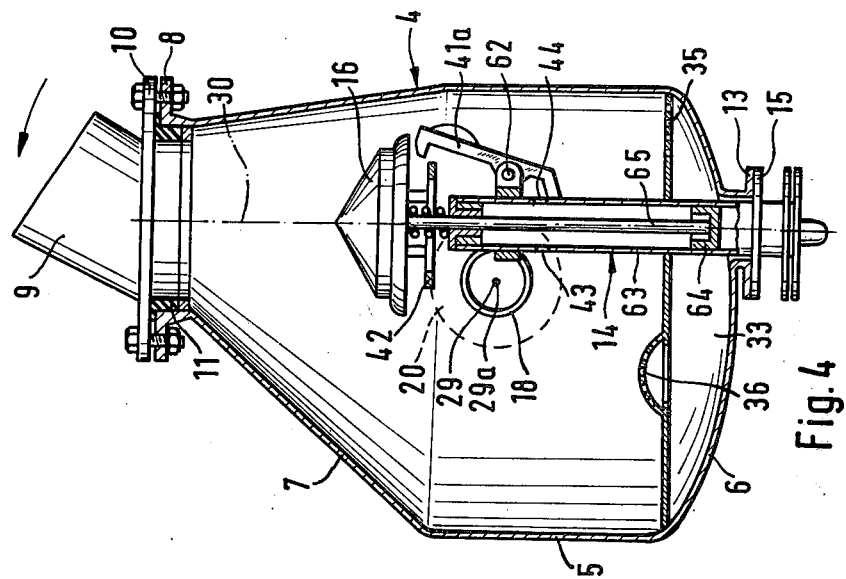
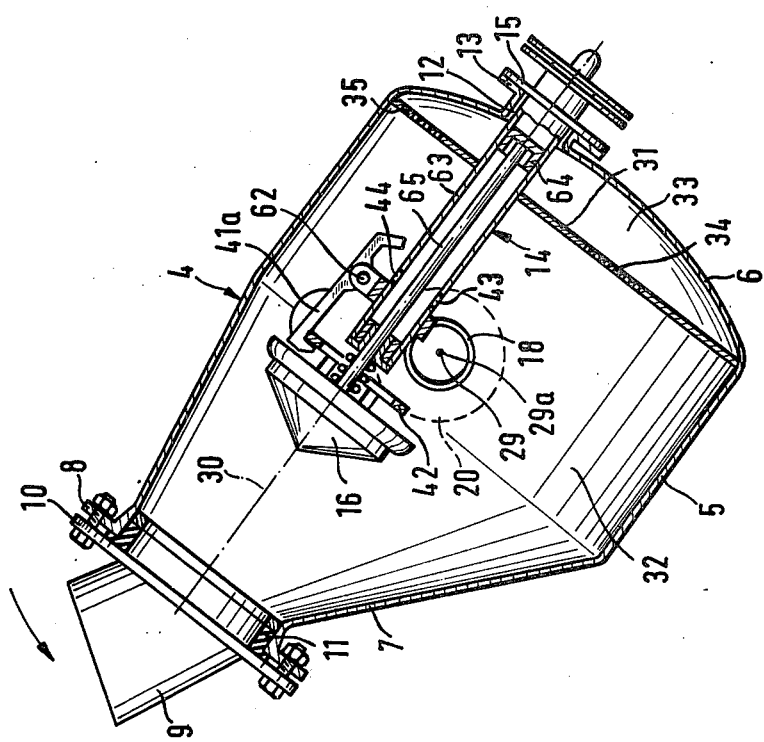

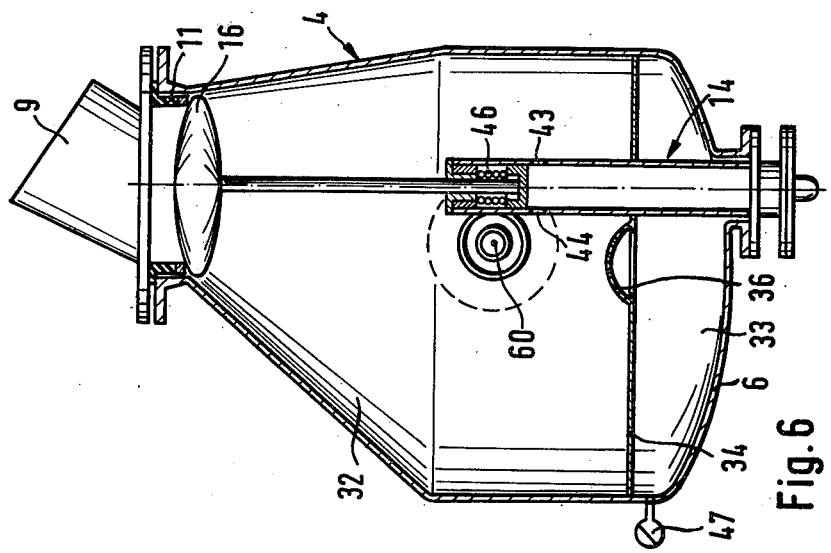
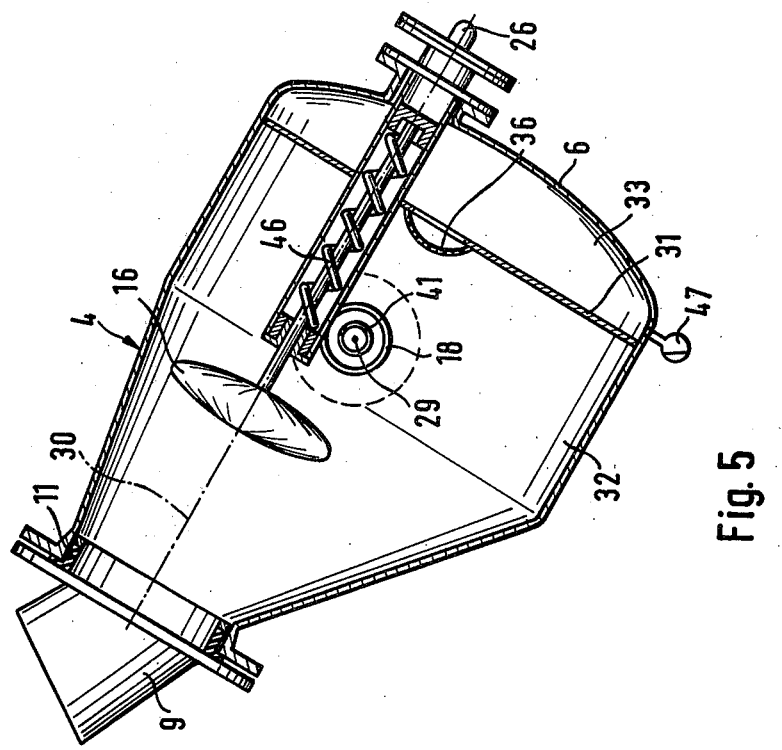

PRESSURE VESSEL AND METHOD FOR COOKING FOOD IN A PRESSURE VESSEL

BACKGROUND OF THE INVENTION

This invention generally relates to a pressure vessel, more particularly though not exclusively for a pressure cooker for cooking food, and to a method of cooking food, in a pressure vessel.

In a known type of pressure cooker, food especially meat, is roasted and cooked in a hot liquid. During roasting and cooking, the cooker is closed by a cover, and then the pressure in the cooker is raised e.g. by introduction of steam.

OBJECTS OF THE INVENTION

It is a primary object of the present invention to provide an improved pressure vessel and an improved method of cooking food.

It is a further object of the invention to provide an improved pressure vessel and an improved method of cooking food in which food can be cooked in a very short time without requiring a hot liquid layer.

It is a still further object of the invention to provide an improved pressure vessel and an improved method of cooking food in which the material to be treated or cooked may be periodically wetted with liquid such as water.

SUMMARY OF THE INVENTION

According to the present invention, there is provided a pressure vessel having therein a first zone in which solid material to be pressure treated is received in use, a closable opening to enable the solid material to be introduced into the first zone, and a second zone communicating with the first zone, and disposed in a lower portion of the vessel and means supporting the pressure vessel for pivotal movement about an axis. With a pressure cooker having such pressure vessel, various cooking operations may be performed in an inexpensive and quick manner. For example, meat may be quickly roasted and cooked. Farinaceous pastes or pasta, especially spaghetti, are cooked in a very short time and legumes are opened in a short time and then cooked, if desired. In the same way, rice may be cooked in a very short time. Such cooking times are as little as about 25% of atmospheric pressure cooking times and 50% of the time required in known pressure cookers.

Also according to the present invention, there is provided a method of cooking food, comprising the steps of introducing food into a pivotably supported pressure vessel, providing a saturated steam pressure of 0.2 to 3.5 atmospheres gauge in the vessel, periodically pivoting the vessel about its axis, and removing the thus cooked food from the vessel.

DESCRIPTION OF PREFERRED EMBODIMENTS

Figure 1:
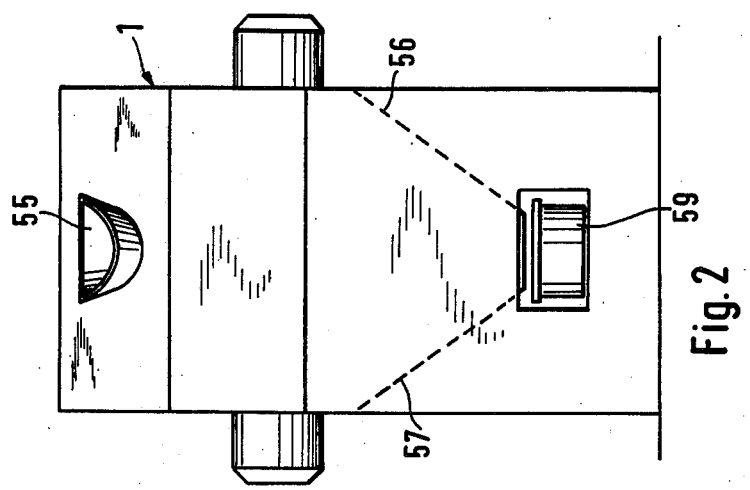
Figure 2:
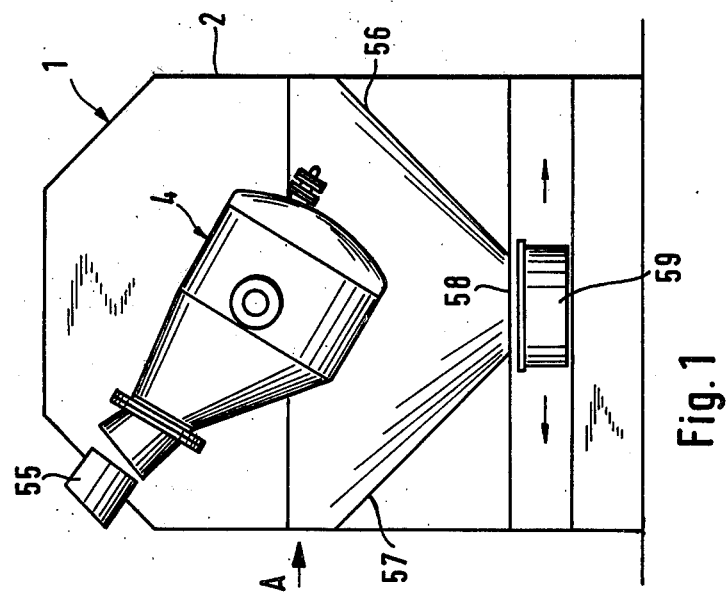
Figure 7:
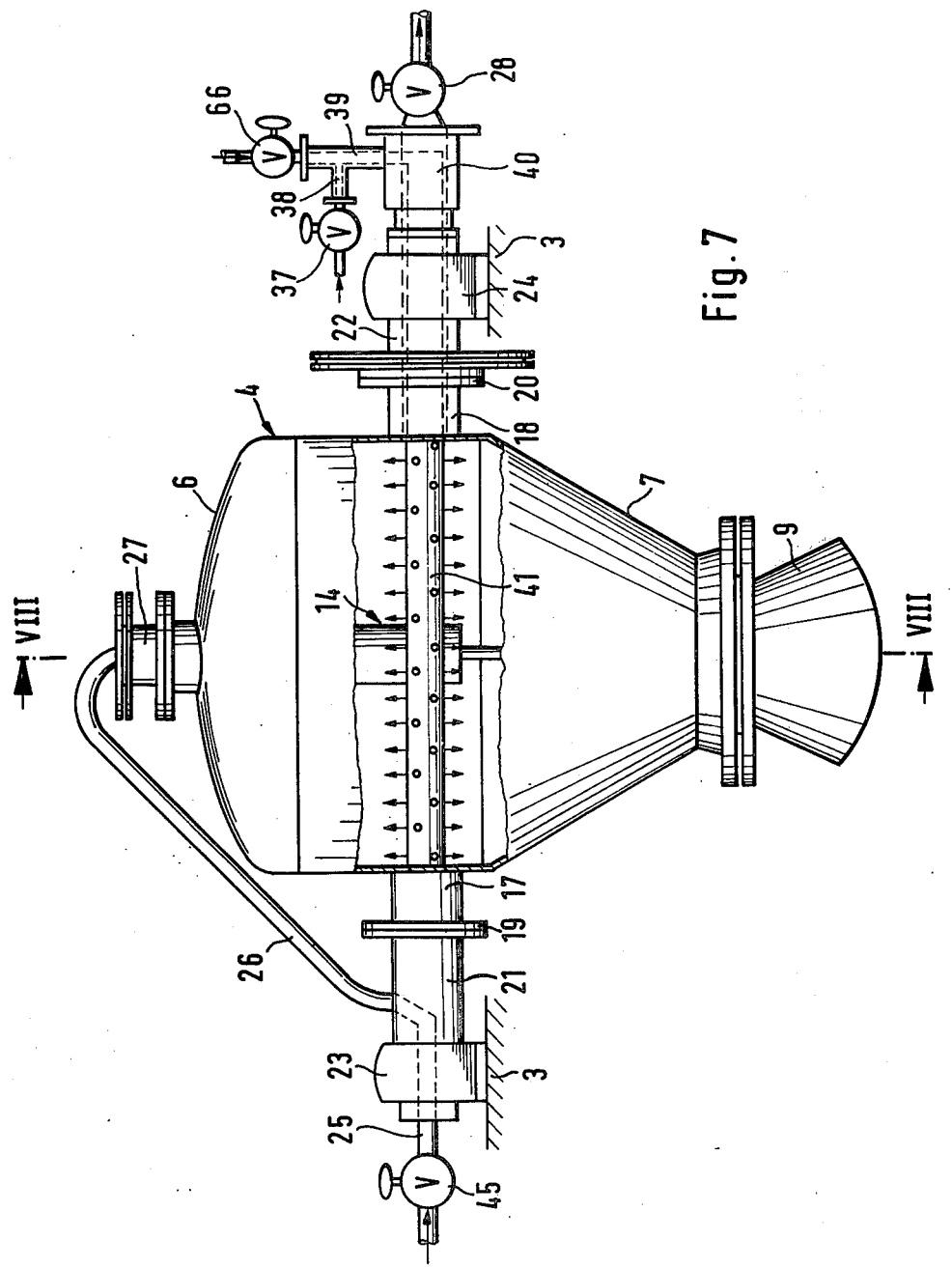
Figure 8:
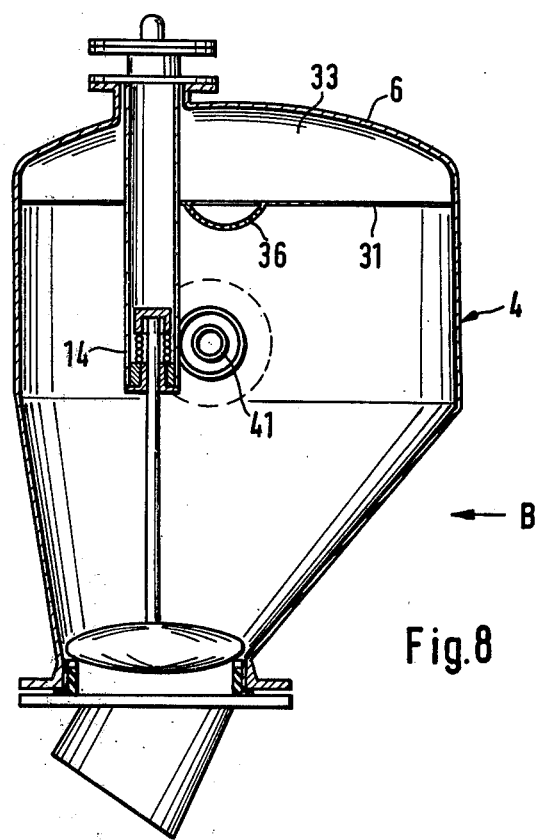

Embodiments of the present invention will now be described by way of example and without restriction of the invention to these embodiments, with reference to the accompanying drawings. Of the drawings:

FIG. 1 is a side elevational view of a pressure cooker having a pressure vessel, with one side wall of the cooker being omitted for clarity, FIG. 2 is a side view of the pressure cooker in the direction of arrow A in FIG. 1, FIG. 3 is a sectional view of one embodiment of pressure vessel in a filling position with an opening and closing device shown in a locked condition, FIG. 4 is a sectional view of the vessel illustrated in FIG. 3 but with the opening and closing device in a released condition, FIG. 5 is a sectional view of a further embodiment of pressure vessel shown in an open condition, FIG. 6 is a sectional view of the vessel illustrated in FIG. 5 in a closed condition, FIG. 7 is a partly cut-away, elevational view of the pressure vessel in the direction of arrow B in FIG. 8, and FIG. 8 is a sectional view of the line VIII—VIII in FIG. 7.

Referring to the drawings, the pressure cooker 1 has a housing 2 provided with a frame 3 (FIG. 7) on which a pressure vessel 4 is supported for pivotal or rotational movement about a horizontal axis. In an upper part of the housing there is provided a funnel 55 aligned with a filler opening of the pressure vessel 4 when the latter is in a filling position (as shown in FIG. 1). Downwardly convergent walls 56 and 57 are provided in the lower portion of the housing and define a bottom outlet opening 58. A cup-shaped removable container 59 into which cooked food is poured from the pressure vessel 4, after completion of the treatment therein is provided under the opening 58, and the cooked food is taken out of the cooker by pulling out the container 59.

Referring now to FIG. 3, the embodiment of pressure vessel 4 illustrated therein has a first cylindrical section 5 of circular cross-section. This section 5 is closed at its lower end by a domed base 6 and at its upper end by a second section 7 having the shape of an oblique truncated cone. At its upper end, the second section 7 is provided with a flange 8 to which a filler funnel 9 having a flange 10 is connected by means of bolts. A similar seal 11 seals the joint between the funnel 9 and the section 7.

The base 6 of the pressure vessel 4 has an exit 12 with a flange 13 through which a piston and cylinder device 14 passes to project into the interior of the pressure vessel 4, the piston and cylinder device 14 being connected with the flange 13 and hence with the pressure vessel 4 through a flange 15. The piston and cylinder device 14 is used for moving a closure member 16 as will be described hereinafter.

As seen particularly in FIG. 7 the pressure vessel 4 has two unions 17 and 18 lying on the pivotal axis of the pressure vessel 4, the pivotal axis passing through the centre of gravity 60 of the pressure vessel 4. The unions 17 and 18 are connected through flanges 19 and 20 to an inlet shaft 21 and an outlet shaft 22 respectively which are in turn rotatably supported on pedestal bearings 23 and 24, whereby the pressure vessel 4 is rotatable and pivotable. The shaft 21 receives a steam feed pipe 25 connected to a steam source (not shown) and controlled by a valve 45 supported in a sliding bearing within the shaft 21 and sealed by a packing box. From the steam feed pipe 25, a connection is provided through a high pressure tube 26 to a steam union 27 of the pressure vessel. The steam outlet extends through the shaft 22 and through an outlet valve 28.

The piston and cylinder device 14 is parallel to the axis of symmetry of the cylindrical section 5 and displaced with respect thereto in such a way that the axis of symmetry 30 of the piston and cylinder device 14 extends through the centre of the upper end of the frusto-conical section 7. The centre of gravity 29 of the pressure vessel 4 lies between the axis of symmetry of the cylindrical section and the axis of symmetry 30 of the piston and cylinder device 14.

The funnel 9 is formed in such a way that its opening is directed upwardly in the filling position of the pressure vessel shown in FIG. 3. For charging, the pressure vessel is brought into the position shown in FIG. 3. The food to be cooked is introduced through the funnel and slides down the wall 7 into the cylindrical section 5 of the pressure vessel.

At the lower end of the pressure vessel, there is provided a base 31 separating the pressure vessel into a first zone or section 32 and a second zone or section 33. Wall 31 has sieve openings 34, 35 and 36 therethrough connected with one another by the two zones 32 and 33. The embodiment of the sieve opening 36 shown in FIG. 5 is particularly advantageous because, owing to the convex form of the sieve surface, liquid flowing from the second zone 33 to the first zone 32 (as will be described hereinafter) is sprayed onto the food in the shape of a wide-angle cone as is the case with a watering can. An optimum interaction between the food and the liquid is achieved thereby.

A valve 37, connecting pipes 38 and 39 and a bore 40 in the outlet shaft 22 are provided whereby water can be introduced into the pressure vessel 4 (FIG. 7). In the embodiment shown in FIGS. 7 and 8, water is sprayed into the pressure vessel through a spray tube 41. A particularly good distribution is achieved thereby. Additionally, the connecting pipe 39 may be selectively connected through a valve 66 to a source of superheated steam and/or a source of a liquid containing flavouring agents. If required, an injector may be provided.

The closure member 16 is movable by the piston and cylinder device 14 between an open position (see FIGS. 3, 4 and 5) and in which it is spaced from the seal 11 and lies internally of the vessel 4 and a closed position in which it is sealed against the seal 11 (FIG. 6). A gravity action locking lever 41a having a hooked end is pivotable about an axis 62 substantially parallel to the rotational axis 29a of the pressure vessel 4. The centre of gravity of the lever 41a lies between this axis and the hooked end. When the closure member 16 is in its open position, the hooked end of the lever 41a engages a locking ring 42 fixed to and spaced from the underside of the closure member 16, as soon as the pressure vessel 4 is rotated from the position illustrated in FIG. 4 in a counterclockwise direction through a predetermined angle into a first rotational position of the pressure vessel (as shown in FIG. 3). It holds the closure member 16 in its opened position until a second rotational position of the pressure vessel 4 is reached. At this position, the lever 41a has pivoted to a position (FIG. 4) in which it no longer engages the ring 42 thereby leaving the closure member 16 under the action of gravity, in its position but free to be moved into its closed position when the piston and cylinder device 14 is actuated. The piston and cylinder device 14 comprises a cylinder 63 extending into the pressure vessel 4 and a piston 64 connected with the closure member 16 by a piston rod 65. Movement of the piston 64 is controlled by steam introduced into the end of the cylinder 63 remote from the closure member 16 via the tube 26 and the union 27.

Hereinafter, the operation of the pressure cooker will be described with reference to the embodiment of FIGS. 3 and 4. Under its own weight, the closure member 16 has moved into its open or retracted position when the pressure vessel shown is in its second rotational position (FIG. 4). Upon rotation of the pressure vessel, from this position into the filling position or first rotational position (FIG. 3) the locking lever 41a engages the ring 42 to lock the closure member 16 in its open position, food to be cooked is introduced into the pressure vessel through the funnel 55 of the housing and the funnel 9 of the pressure vessel. After this, the vessel is moved back to its second rotational position, the outlet valve 28 is closed and the piston and cylinder device 14 is pressurised with steam. The closure member 16 is thereby brought into contact with the seal 11 and into its closed position schematically shown in FIGS. 6 and 8. When the closure member 16 is in its closed position, the piston 64 has moved sufficiently far to expose steam outlet openings 43 and 44 (FIG. 6) in the cylinder 63 whereby steam from the steam source (not shown) is fed through the tube 26 into the pressure vessel.

As the pressure within the pressure vessel increases, the force acting on the closure member increases because the closure member has an exposed area which is greater than the effective area of the piston 64. The maximum operating pressure builds up in the pressure vessel within a few seconds. Through the bore 40 and the spray tube 41, a quantity of water depending upon the nature and amount of the food is introduced into the pressure vessel. If desired, superheated steam, i.e. steam which is free from suspended liquid droplets, may be introduced through the valve 66 for providing a temperature shock, or a liquid containing flavouring agents may be introduced into the pressure vessel for providing a flavouring operation. Periodically during cooking the pressure vessel 4 is pivoted or rotated about its axis at certain intervals of time. The water thus contacts the food and passes through the sieve openings 34, 36 and 36 into the second zone 33 of the pressure vessel when the latter is in its operating position shown in FIG. 6. As soon as the pressure vessel is rotated from the position shown in FIG. 6 into the position shown in FIG. 8, the water passes from the second zone 33 back into the first zone 32 and flows over the food. This operation is performed several times during cooking.

When the cooking time is completed, the valve 45 of the steam admission is closed and the outlet valve 28 is opened. As soon as substantially atmospheric pressure is achieved in the pressure vessel and the pressure vessel is rotated in counterclockwise direction the cover 16 falls back into its retracted open position by its own weight. Through continued rotation of the pressure vessel in counterclockwise direction the locking lever 41a pivots by gravity about its axis and again moves into its locking position shown in FIG. 3. The pressure vessel is then rotated to the left in the direction of the arrows of FIGS. 3 and 4 so that the container opening is directed towards the bottom. The cooked food then slides through the funnel 9 and the opening 58 in the housing and into the container 59 and removed from the pressure cooker by removing the container 59.

By supply of water through the spray tube 41, the pressure vessel may then be easily rinsed, so that the cooker may successively be used for different foods.

In the embodiment of FIGS. 5 and 6, the locking lever 41a and the ring 42 are replaced by a spring 46 which holds the closure member 16 in its open position when pressure is not being applied to the device 14. Closing of the closure member 16 is achieved in the same way as the embodiment of FIGS. 3 and 4 by supplying the pressure medium to the piston and cylinder device 14. Upon pressure release, the spring 46 moves the closure member 16 back into its open position shown in FIG. 5 as soon as substantially atmospheric pressure is achieved in the pressure vessel. In this embodiment a condensate drain 47 is provided in the second zone 33 of the pressure vessel. If desired, it is possible thereby to achieve a steam flow in the pressure cooker during the cooking which assists in ensuring uniform interaction of the food with the steam. The condensate drain 47 is also used for controlling the water level in the second zone 33. Especially, it may be arranged so that the water level is always below wall 34 in the position shown in FIG. 6 so that the food does not lie in a layer of water.

A control device (not shown) is provided by means of which the quantity of water to be added, the pressure level and the treatment time can be adjusted. When the treatment operation is completed, the pressure vessel can be automatically opened and rotated into its emptying position, so that the product automatically falls into the container 59. In this way, the desired cooking time is always maintained. The control may be programmed so as to effect automatically the following method disclosed hereinafter.

If desired, it is also possible to close the openings between the first and the second zone through appropriate valves in one or in both directions. In this way, for example during cooking meat, the juice of the meat may be separated into the second zone.

Hereinafter methods of cooking are described which may be performed with the above described pressure cooker.

For cooking rice introduced into the pressure vessel, a quantity of water is added the volume of which substantially corresponds to the volume of rice. By supplying saturated steam, i.e. steam in which some condensed liquid is present in a stable balanced condition, at a pressure between 0.5 and 1.6 atmospheres gauge (preferably up to 1.2 atmospheres gauge) is built up in the pressure vessel. Approximately every 30 seconds the pressure vessel is pivoted from the position shown in FIG. 6 into the position shown in FIG. 8 and back again, and thus the rice is wetted by the water accumulated in the second or bottom zone. With previously untreated rice the treatment time is 6 and 12 minutes according to the type of rice. When the cooking time has elapsed, the rice is sprayed with cold water flowing out of the spray tube 41, whereby agglomeration of the rice is avoided. A particularly excellent result is achieved by building up a pressure with saturated steam of 0.7 atmosphere gauge, a cooking time of 10 minutes and pivoting the vessel at intervals of 30 seconds. When the method is completed, the rice is delicately cooked while a sufficient graininess is maintained.

In accordance with a further method, the pressure cooker is used for cooking pasta e.g. spaghetti. About the same volume of water and pasta is introduced into the pressure vessel. The pressure vessel is then supplied with saturated steam of a pressure of 0.3 to 1.8 atmospheres gauge, preferably 0.8 to 1.2 atmospheres gauge. The vessel is pivoted at short intervals so that the pasta is regularly wetted by the water accumulated in the second zone. The pasta is cooked after approximately 6 to 12 minutes depending on the type of pasta. The steam is then released and the pasta sprayed with the water flowing out from the spray tube in order to avoid agglomeration thereof. An excellent result is achieved with saturated steam of a pressure of 0.5 atmospheres gauge, the pressure vessel continuously rotating during the first two or three minutes and then performing one revolution after each half minute. The cooking time of spaghetti for which a cooking time of 25 minutes is indicated with normal treatment is 8 minutes.

In accordance with a further method legumes such as beans or peas can be opened using the pressure cooker. About the same volume of water as the legumes is added thereto. The pressure vessel is supplied with saturated steam of 0.4 to 1.5 atmospheres gauge. Depending on the type of legume, the treatment time is between 8 and 20 minutes, the pressure vessel performing one revolution at regular intervals and the legumes being thus wetted by the water from the second zone. Rotation at the beginning of the treatment is particularly important in order for the saturated steam and the water to contact the legumes effectively. After the treatment time, the beans or peas are uniformly swollen up, without the pods being completely detached. If desired, complete cooking of the legumes may be achieved by extending the treatment time. When opening peas, an especially good result is achieved when the pressure vessel is at first supplied with saturated steam at 0.3 to 0.5 atmospheres gauge for 5 to 8 minutes and then a maximum pressure up to 2 atmospheres gauge over about 3 minutes. Subsequently, the pressure is slowly lowered to atmosphere over a period of about 2 minutes. Rotation or pivoting of the pressure vessel is performed as in the preceding example.

According to a further method, meat is roasted and cooked with the pressure cooker. To this end, after introduction of the meat into the pressure cooker, the pressure vessel is supplied with saturated steam of 0.5 to 3.5 atmospheres gauge. Whether water is introduced into the pressure vessel and the quantity thereof depend upon the kind of meat. The meat extracts a certain quantity of water from the saturated steam so that water need not be introduced in every case. The meat juice accumulates in the second or bottom zone of the pressure vessel and is poured over the meat at each revolution of the same. The treatment time is selected depending on the kind of meat. The treatment time is about 50% of the cooking time required with a conventional pressure cooker. In the case where meat juices are to be extracted from bones, excellent recovery of meat juices are obtained by first supplying the vessel with saturated steam at a pressure between 0.2 and 0.3 atmospheres gauge which is slowly increased up to a maximum pressure of 3.5 atmospheres gauge. However, in the case where the meat is to be cooked while retaining the meatjuice therein the pressure vessel is immediately supplied with saturated steam of a maximum pressure between 2.5 and 3.5 atmospheres gauge, preferably 3.5 atmospheres gauge. This closes the pores so that the juice remains in the meat. At the beginning of the cooking, superheated steam may be introduced into the pressure vessel causing a heat shock for closing the pores. Subsequently the roasting and cooking is performed with saturated steam.

In the cooking of food in the pressure cooker, the amount of water to be added is not critical; if too much water is added it is drained into the second zone. If an unsufficient quantity of water is added, the product to be treated extracts the required water from the saturated steam. When the pressure vessel is frequently rotated or pivoted, the addition of less water is sufficient, as the water absorption by the product is improved by the more frequent overflowing.

Of course it is also possible, if desired, to operate the pressure cooker without the addition of water and without rotating.

The desired flavouring agents for the cooking method may be added to the water to be introduced. For example, the water to be added for cooking spaghetti is salt-bearing to the desired extent.

The pressure vessel may, of cource, be used for pressure treating any solid material although it is mainly intended for cooking food.

The invention in its broader aspects is not limited to the specific details shown and disclosed and departures may be made from such details without departing from the spirit and the scope of the invention.

What is claimed is:

1. A pressure vessel for treatment of solid material with a pressure medium, comprising:
   means for supporting said pressure vessel for pivotal movement about a predetermined axis;
   a first vessel zone having a closable opening for introducing said solid material into said first vessel zone, said first vessel zone being disposed in an upper portion of said pressure vessel;
   a second vessel zone adjacent to said first vessel zone, said second vessel zone being disposed in a bottom portion of said pressure vessel;
   operating means for opening and closing said closable opening, said operating means being controlled by said pressure medium; and
   means separating said first vessel zone from said second vessel zone and having a plurality of openings therethrough, said openings having dimensions selected for allowing passage of liquid material but preventing passage of said solid material from said first vessel zone to said second vessel zone;
   whereby liquid material is allowed to flow through said separating means and between said first and second vessel zones during said pivotal movement of said pressure vessel and said solid material is retained in said first vessel zone.

2. The pressure vessel of claim 1, wherein said operating means is a piston and cylinder device extending into said pressure vessel.

3. The pressure vessel of claim 2, comprising a closure member for closing said closable opening, said closure member being arranged for opening to the inside of said pressure vessel and being connected with said piston and cylinder device for operation of said closure member.

4. The pressure vessel of claim 1, comprising a housing surrounding said pressure vessel and provided with a filling opening in the upper part of said housing, and removable means in a bottom portion of said housing for receiving the solid material out of said pressure vessel after treatment therein.

5. The pressure vessel of claim 1, comprising a condensate drain provided in said second vessel zone.

6. A pressure vessel for cooking solid food in the presence of a liquid and a pressure medium, comprising:
   means for providing liquid and heated pressure medium in said vessel;
   means for supporting said pressure vessel for pivotal movement about a predetermined axis between a first rotational position and a second rotational position;
   a first vessel zone having a closable opening for introducing solid food into said first zone, said first zone being disposed in an upper portion of said vessel for cooking said food;
   a second vessel zone adjacent to said first vessel zone, said second vessel zone being disposed in a lower portion of said vessel for accumulating said liquid;
   means separating said first zone from said second zone and having a plurality of openings therethrough with dimensions allowing passage of liquid but preventing passage of solid food from said first zone to said second zone;
   whereby during cooking in said pressure medium said solid food is retained in said first zone and said liquid is allowed to flow through said separating means and between said first and second zones such that said liquid accumulates in said second zone separate from said solid food when said vessel is in its first rotational position and contacts said solid food when said vessel is in its second rotational position.

7. A pressure vessel according to claim 6 wherein said closable opening is disposed above said predetermined axis when said vessel is in its first rotational position and below said axis when said vessel is in its second rotational position.

8. A pressure vessel according to claim 6 which includes means for supplying steam from a steam source into said vessel during said pivotal movement.

9. A pressure vessel according to claim 6 which includes means for supplying water from a water source into said vessel during said pivotal movement.

10. A pressure vessel according to claim 9 wherein said water supply means comprises a spray tube extending into said first zone.

11. A pressure vessel according to claim 10 wherein at least a portion of said spray tube extends along said predetermined axis.

* * * * *